(12) United States Patent
Hatano et al.

(10) Patent No.: US 7,703,440 B2
(45) Date of Patent: Apr. 27, 2010

(54) CONTROL SYSTEM FOR INTERNAL COMBUSTION ENGINE

(75) Inventors: Junichi Hatano, Wako (JP); Satoshi Yamaguchi, Wako (JP); Katsuji Wada, Wako (JP); Kensuke Takahashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/137,939

(22) Filed: Jun. 12, 2008

(65) Prior Publication Data
US 2009/0151697 A1    Jun. 18, 2009

(30) Foreign Application Priority Data
Jun. 27, 2007  (JP)  ............................ 2007-168342
Jun. 28, 2007  (JP)  ............................ 2007-169912

(51) Int. Cl.
*F02D 41/30* (2006.01)
(52) U.S. Cl. .................. 123/435; 123/299; 701/103
(58) Field of Classification Search ........... 701/103; 123/295, 298–300, 305, 435, 568.11, 568.12
See application file for complete search history.

(56) References Cited

U.S. PATENT DOCUMENTS

| | | | |
|---|---|---|---|
| 6,877,479 B2 * | 4/2005 | Miura | 123/319 |
| 7,027,906 B2 * | 4/2006 | Araki | 701/104 |
| 7,054,734 B2 * | 5/2006 | Todoroki et al. | 701/105 |
| 7,121,083 B2 * | 10/2006 | Ishibashi et al. | 60/285 |
| 2005/0145220 A1 | 7/2005 | Damitz et al. | |
| 2006/0201477 A1 | 9/2006 | Scherrieble et al. | |

FOREIGN PATENT DOCUMENTS

| | | |
|---|---|---|
| EP | 1 302 650 A2 | 4/2003 |
| EP | 1 568 876 A2 | 8/2005 |
| JP | 10-280978 | 10/1998 |
| WO | WO 02/20956 A1 | 3/2002 |
| WO | WO 2005/031134 A1 | 4/2005 |

* cited by examiner

*Primary Examiner*—Stephen K Cronin
*Assistant Examiner*—Johnny H Hoang
(74) *Attorney, Agent, or Firm*—Arent Fox LLP (57) ABSTRACT

A control system for an internal combustion engine having at least one fuel injection valve for injecting fuel into a combustion chamber of the engine. A compression end temperature in the combustion chamber is estimated. A target compression end temperature is calculated according to an operating condition of the engine. A main injection and a plurality of pilot injections before the main injection are performed by at least one fuel injection valve. A fuel injection amount in a first-performed pilot injection of the plurality of pilot injections is controlled so that the estimated compression end temperature coincides with the target compression end temperature.

6 Claims, 8 Drawing Sheets

CONTROL SYSTEM FOR INTERNAL COMBUSTION ENGINE

BACKGROUND OF THE INVENTION

1. Field of the Invention

The present invention relates to a control system for an internal combustion engine in which compression ignition is performed, and particularly to a control system for controlling an amount of fuel injected during a pilot injection of fuel that is performed before a main injection of fuel.

2. Description of the Related Art

Japanese Patent Publication No. 3572435 (JP '435) discloses a control system for an internal combustion engine that estimates a compression end temperature that is a temperature of an air-fuel mixture in a cylinder when a piston is positioned at a compression top dead center. The control system disclosed by JP '435 increases the pilot injection amount of fuel when the estimated compression end temperature becomes relatively high. The control system of JP '435 suppresses a combustion noise by increasing the pilot injection amount of fuel in a high-load operating condition of an engine.

The ignitionability of fuel in the compression-ignition internal combustion engine depends on the compression end temperature during a low temperature condition, e.g., immediately after the cold start of the engine, or in a low load operating condition immediately after starting the engine. If similar control for a high load operating condition is attempted by the control system taught by JP '435, as in the low temperature condition or in the low load operating condition, the ignitionability of fuel is known to degrade.

SUMMARY OF THE INVENTION

The present invention was made in contemplation of the above-described point, and an aspect of the invention is to provide a control system for an internal combustion engine, which appropriately controls an amount of fuel injection during the pilot injection, thereby obtaining stable ignitionability, especially in a low temperature condition, or in a low load operating condition, of the engine.

To attain the above aspect, the present invention provides a control system for an internal combustion engine having a fuel injector for injecting fuel into a combustion chamber of the engine. The control system includes a compression end temperature estimator, a target compression end temperature setter, and a fuel injection controller. The compression end temperature estimator estimates a compression end temperature in the combustion chamber. The target compression end temperature setter sets a target compression end temperature according to an operating condition of the engine. The fuel injection controller performs a plurality of pilot injections via the fuel injection means before performing the main injection. The fuel injection controller controls a fuel injection amount in a first-performed pilot injection of a plurality of pilot injections so that the estimated compression end temperature coincides with the target compression end temperature.

With the above-described structural configuration, the fuel injection amount in the first-performed pilot injection is controlled so that the estimated compression end temperature coincides with the target compression end temperature, which is set according to the engine operating condition. The compression end temperature tends to become higher as the fuel injection amount of the first-performed pilot injection increases. Therefore, by controlling the first-performed pilot injection amount so that the estimated compression end temperature coincides with the target compression end temperature, an appropriate compression end temperature is realized and stabile ignitionability is obtained during the low temperature condition, or during the low load operating condition, of the engine.

Preferably, the control system further includes a pressure detector for detecting the pressure in the combustion chamber, and the compression end temperature estimator estimates the compression end temperature according to the pressure detected by the cylinder pressure detector.

With the above-described structural configuration, the compression end temperature is estimated according to the detected pressure in the combustion chamber. Comparatively, the estimation is performed more accurately, for example, with a method of estimating the compression end temperature, according to the intake air temperature.

The present invention also provides a control system for an internal combustion engine having a fuel injector for injecting fuel into a combustion chamber. The control system includes a cylinder pressure detector, a heat release amount calculator, and fuel injection controller. The cylinder pressure detector detects a pressure in the combustion chamber. The heat release amount calculator calculates a heat release amount in a predetermined crank angular range according to a pressure detected by the cylinder pressure detector. The fuel injection controller performs a main injection and a plurality of pilot injections before the main injection through the fuel injector. The fuel injection controller controls a fuel injection amount in a first-performed pilot injection of the plurality of pilot injections according to the heat release amount calculated by the heat release amount calculator.

With the above-described structural configuration, the heat release amount in the predetermined crank angular range is calculated according to the detected pressure in the combustion chamber, and the amount of fuel injected during the first pilot injection of the plurality of pilot injections is controlled according to the calculated heat release amount. The heat release amount from the pilot injection occurring immediately before the main injection is detected by appropriately setting the predetermined crank angular range. Further, by controlling the fuel injection amount of the first-performed pilot injection according to the heat release amount, ignitionability of the fuel injected during the pilot injection immediately before the main injection is improved, and, consequently, ignitionability of the fuel injected during the main injection is also improved. Accordingly, stable ignitionability is obtained, especially in the low temperature condition, or the low load operating condition, of the engine.

DETAILED DESCRIPTION OF THE PREFERRED EMBODIMENTS

Preferred embodiments of the present invention will now be described with reference to the drawings.

First Embodiment

Figure 1:
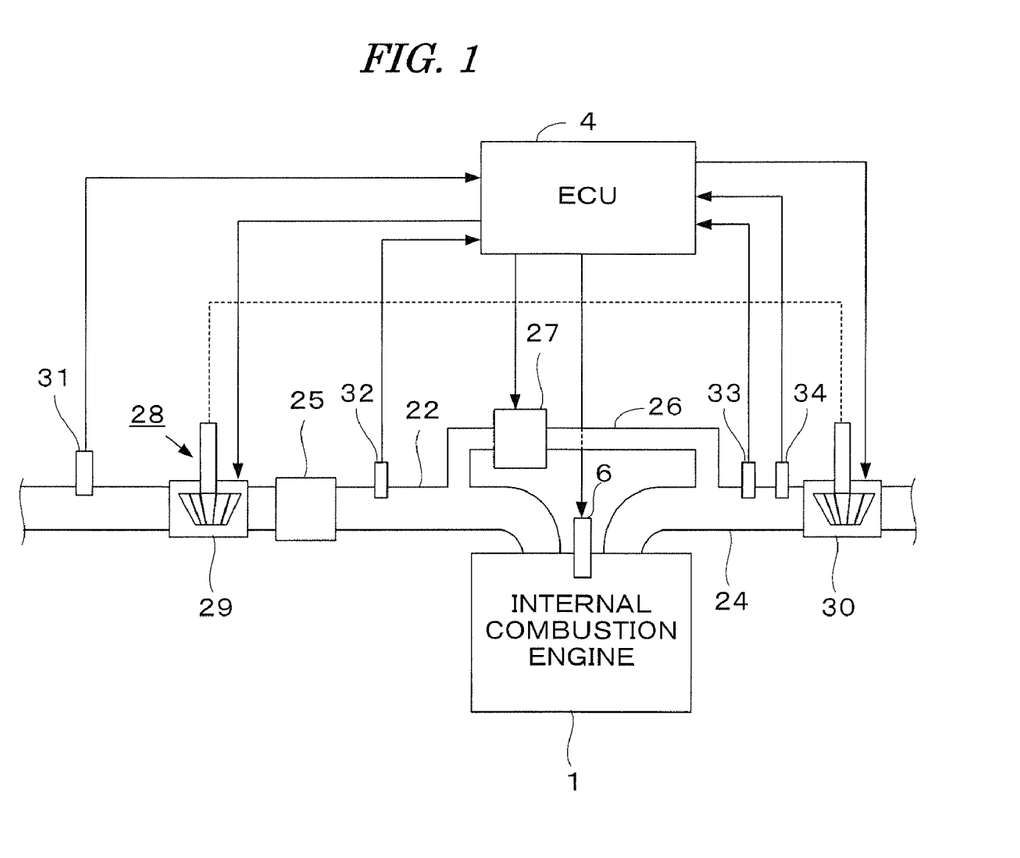
FIG. 1 is a schematic diagram of an internal combustion engine and a control system therefor according to one embodiment of the present invention.
Figure 2:
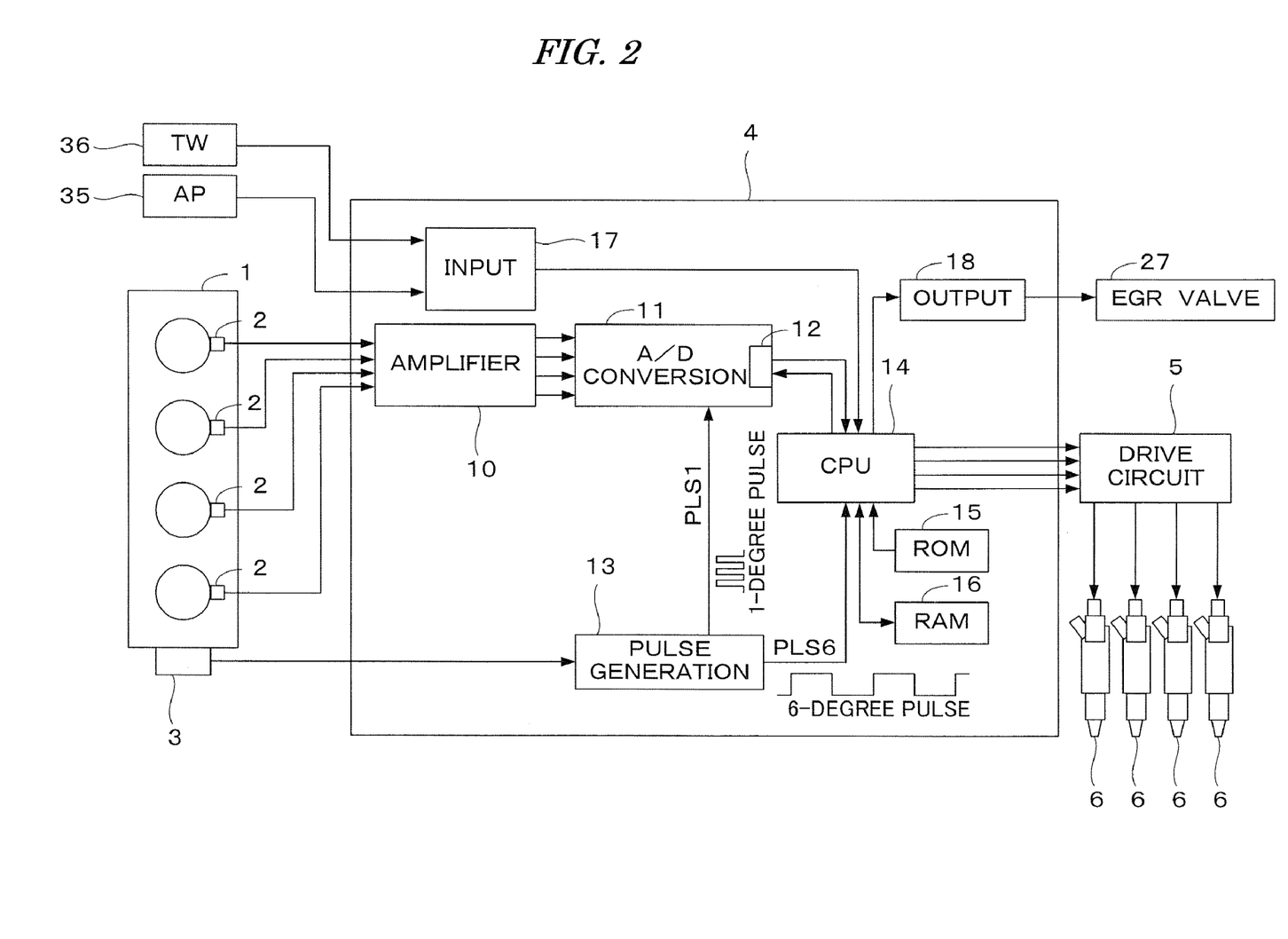
FIG. 2 is a schematic diagram of a part of the control system shown in FIG. 1.

According to one embodiment of the present invention, FIGS. 1 and 2 are schematic diagrams of an internal combustion engine and a control system. The internal combustion engine 1 (hereinafter referred to as "engine"), has four cylinders and is a diesel engine, wherein fuel is injected directly into the cylinders. Each cylinder is provided with a fuel injection valve 6 electrically connected to an electronic control unit 4 (hereinafter referred to as "ECU 4"). The ECU 4 controls a valve opening period and a valve opening timing of each fuel injection valve 6.

The engine 1 has an intake pipe 22, an exhaust pipe 24, and a turbocharger 28. The turbocharger 28 includes a turbine 30 and a compressor 29. The turbine 30 is driven by the kinetic energy of exhaust gases. The compressor 29, which is rotationally driven by the turbine 30, compresses the intake air of the engine 1.

The turbine 30 has a plurality of movable vanes (not shown), and is configured so that the rotational speed of the turbine 30 is adjusted by changing an opening of the movable vanes (hereinafter referred to as "vane opening"). The vane opening of the turbine 30 is electro-magnetically controlled by the ECU 4.

The intake pipe 22 is provided with an intercooler 25 on the downstream side of the compressor 29 for cooling pressurized air.

An exhaust gas recirculation passage 26 for recirculating exhaust gases to the intake pipe 22 is provided between the upstream side of the turbine 30 in the exhaust pipe 24 and the intake pipe 22. The exhaust gas recirculation passage 26 is provided with an exhaust gas recirculation control valve 27 (hereinafter referred to as "EGR valve"), that controls the amount of recirculated exhaust gases. The EGR valve 27 is an electromagnetic valve having a solenoid, wherein a valve opening of the EGR valve 27 is controlled by the ECU 4.

The intake pipe 22 is provided with an intake air flow rate sensor 31 for detecting an intake air flow rate GA on the upstream side of the turbine 29, and an intake air temperature sensor 32 for detecting an intake air temperature TIN on the downstream side of an intercooler 25. The exhaust pipe 24 is provided with an exhaust pressure sensor 33 for detecting an exhaust pressure PEX, and an exhaust gas temperature sensor 34 for detecting an exhaust gas temperature TEX on the upstream side of the turbine 30. The detection signals of sensors 31 through 35 are supplied to the ECU 4.

Each cylinder of the engine 1 is provided with a cylinder pressure sensor 2 for detecting a cylinder pressure (a pressure in the combustion chamber of the engine 1). In this embodiment, the cylinder pressure sensor 2 is configured in one body with the glow plug disposed in each cylinder. The detection signal of the cylinder pressure sensor 2 is supplied to the ECU 4. It is to be noted that the detection signal of the cylinder pressure sensor 2 corresponds to a differential signal of the cylinder pressure PCYL with respect to the crank angle (time), and the cylinder pressure PCYL is obtained by integrating the output of the cylinder pressure sensor.

The engine 1 is provided with a crank angle position sensor 3 for detecting a rotation angle of the crankshaft (not shown) of the engine 1. The crank angle position sensor 3 generates one pulse at every 1 deg of the crank angle, and the pulse is supplied to the ECU 4. The crank angle position sensor 3 further generates a cylinder discrimination pulse at a predetermined crank angle for a specific cylinder of the engine 1, and supplies the cylinder discrimination pulse to the ECU 4.

An accelerator sensor 35 for detecting an operation amount AP of the accelerator pedal of the vehicle driven by the engine 1, a coolant temperature sensor 36 for detecting a coolant temperature TW of the engine 1, a boost pressure sensor (not shown) for detecting an intake pressure (boost pressure) PB on the downstream side of the turbocharger 28, and a vehicle speed sensor (not shown) for detecting a vehicle speed VP of the vehicle are connected to the ECU 4. The detection signals of the above-listed sensors are supplied to the ECU 4.

The ECU 4 provides a control signal of the fuel injection valve 6, provided in the combustion chamber of each cylinder of the engine 1, to a drive circuit 5. The drive circuit 5 is connected to the fuel injection valves 6, and supplies drive signals to the fuel injection valves 6 according to the control signal from the ECU 4. Fuel is thereby injected into the combustion chamber of each cylinder at a fuel injection timing in accordance with the control signal output from the ECU 4. The fuel injection amount is controlled to a value in accordance with the control signal from the ECU 4.

The ECU 4 includes an amplifier 10, an A/D converter 11, a pulse generator 13, a CPU 14 (Central Processing Unit), a ROM 15 (Read Only Memory) for storing programs executed by the CPU 14, a RAM 16 (Random Access Memory) for storing calculation results, etc., an input circuit 17, and an output circuit 18. The detection signal of the cylinder pressure sensor 2 is input to the amplifier 10. The amplifier 10 amplifies the input signal. The signal amplified by the amplifier 10 is input to the A/D converter 11. The pulse signal output from the crank angle position sensor 3 is input to the pulse generator 13.

The A/D converter 11, which includes a buffer 12, converts the cylinder pressure sensor output from the amplifier 10 to a digital value (hereinafter referred to as "pressure change rate") $dp/d\theta$, and stores the converted digital value in the buffer 12. Specifically, a pulse signal PLS1 (hereinafter referred to as "one-degree pulse"), having a crank angle period of one degree, is supplied to the A/D converter 11 from the pulse generator 13, the cylinder pressure sensor output is sampled at intervals of the one-degree pulse PLS1 to be converted to a digital value, and the digital value is stored in the buffer 12.

A pulse signal PLS6, having a crank angle period of six degrees, is supplied to the CPU 14 from the pulse generator 13. The CPU 14 performs a process for reading the digital value stored in the buffer 12 at intervals of the six-degree pulse PLS6. That is, in the present embodiment the A/D converter 11 does not request an interrupt from the CPU 14, but the CPU 14 performs the reading process at intervals of the six-degree pulse PLS6.

The input circuit 17 converts the detection signals from various sensors to digital values and supplies the digital values to the CPU 14. An engine rotational speed NE is calculated from the time period of the six-degree pulse PLS6. A demand torque TRQ of the engine 1 is calculated according to the operation amount AP of the accelerator pedal.

The CPU 14 calculates a target intake air flow rate GACMD, according to the engine operating condition, and supplies a duty control signal for controlling an opening of the EGR valve 27 to the EGR valve 27 through the output circuit 18. The duty control signal is generated so that the detected air flow rate GA coincides with the target intake air flow rate GACMD.

Figure 3A:
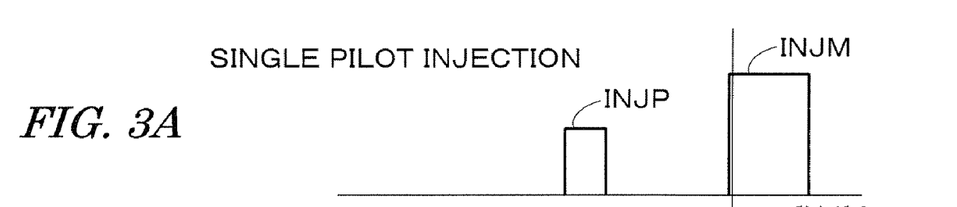
FIGS. 3A and 3B are charts of fuel injection modes.

In this embodiment, the pilot injection of fuel is performed twice before the main injection of fuel with the fuel injection valve 6 (double pilot injection mode) in a predetermined operating condition of the engine 1 in order to secure stable combustion. Normally, one pilot injection INJP is performed before the main injection INJM (single pilot injection mode), as shown in FIG. 3A. In the double pilot injection mode, the pilot injection, which is performed at a timing near compression top dead center, is referred to as "first pilot injection INJP1", and the other pilot injection, which is performed before the first pilot injection INJP1, is referred to as "second pilot injection INJP2". In the single pilot injection mode, only one pilot injection INJP, corresponding to the first pilot injection INJP1, is performed.

Figure 3B:
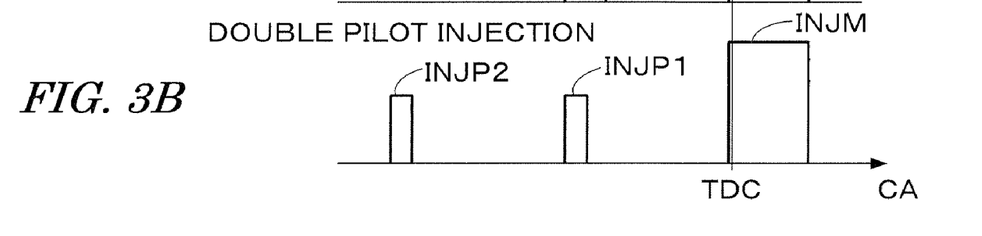

For example, the main injection INJM is performed at a timing substantially equal to the compression top dead center (CA=0), the first pilot injection INJP1 is performed at a timing of about 13 degrees (CA=−13) before the top dead center, and the second pilot injection INJP2 is performed at a timing of about 20 degrees (CA=−20) before the top dead center. Further, if a pilot injection amount QIP in the single pilot injection mode is set to about 4 mg per one injection, a first pilot injection amount QIP1 and a second pilot injection amount QIP2 in the double pilot injection mode is set, respectively, to about 2 mg.

Figure 4A:
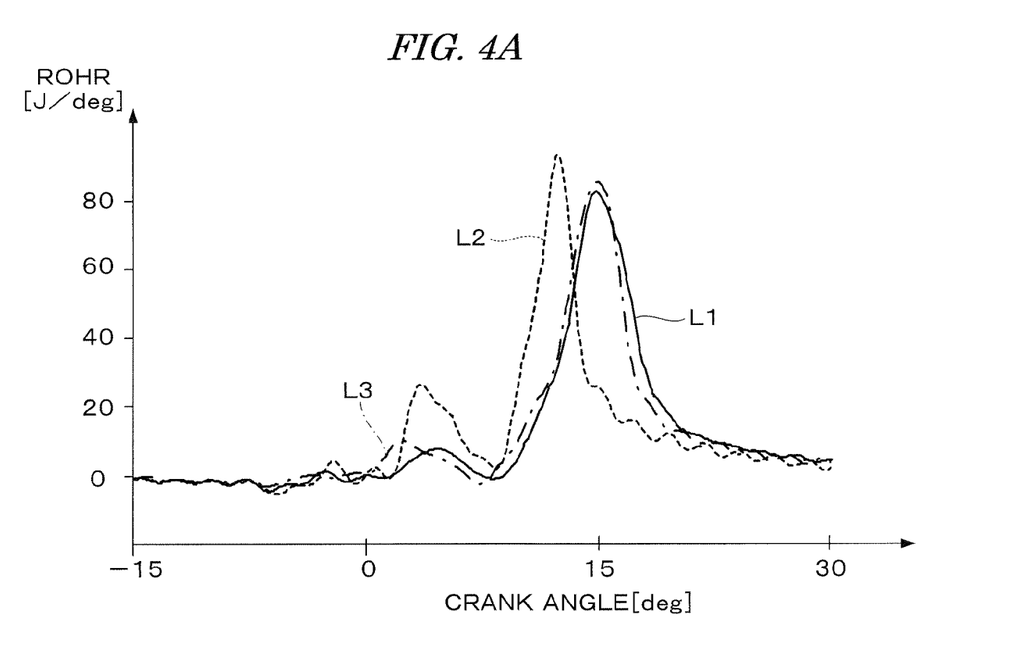
FIGS. 4A and 4B are time charts illustrating a heat release rate (ROHR)
Figure 4B:
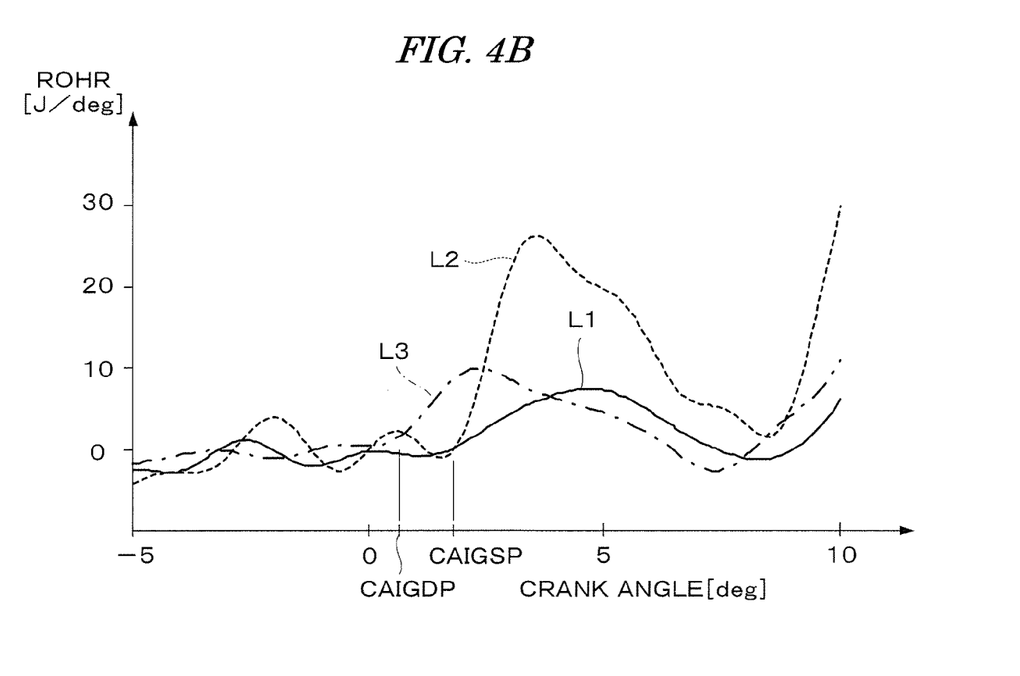

FIGS. 4A and 4B are time charts showing changes in a heat release rate ROHR. The solid line L1 and the dashed line L2, respectively, correspond to examples in which the pilot injection amount is set to 4 mg and 6 mg in the single pilot injection mode. The dot-and-dash line L3 corresponds to an example in which the first pilot injection amount QIP1 and the second pilot injection amount QIP2 are set to 2 mg (i.e., the total amount is 4 mg), in the double pilot injection mode. FIG. 4B shows an expanded portion of FIG. 4A in the vicinity of the compression top dead center (CA=0 deg).

According to FIGS. 4A and 4B, it is confirmed that an ignition timing CAIGSP at which the heat release rate ROHR begins to increase in response to the pilot injection, hardly changes, even if the pilot injection amount changes in the single pilot injection mode. On the other hand, the ignition timing CAIGDP in the double pilot injection mode advances from the ignition timing CAIGSP.

Figure 5A:
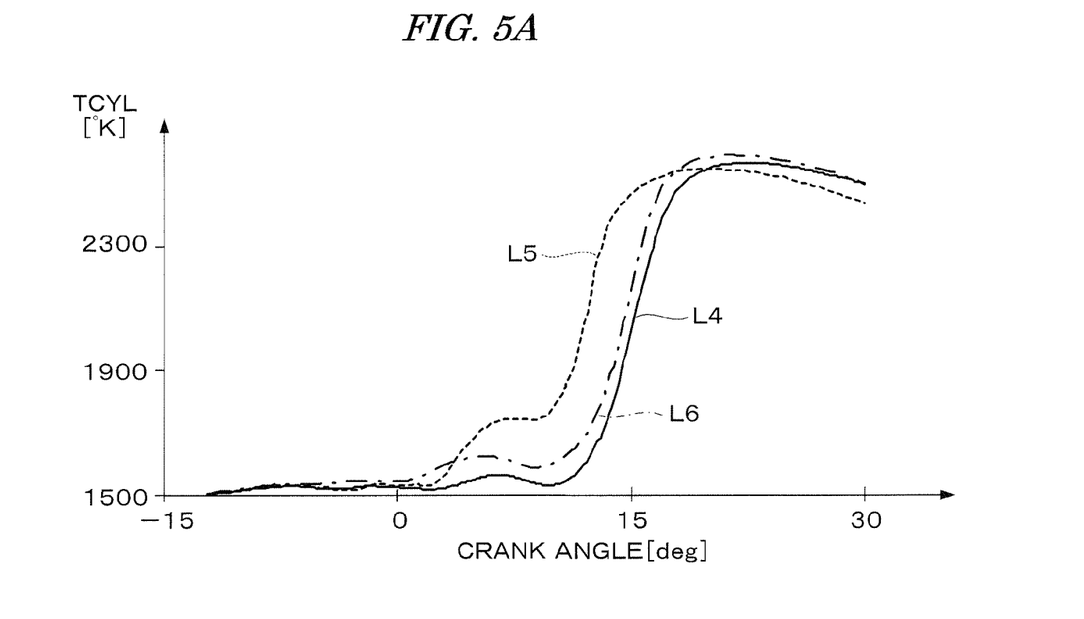
FIGS. 5A and 5B are time charts illustrating a temperature (TCYL) in the cylinder.
Figure 5B:
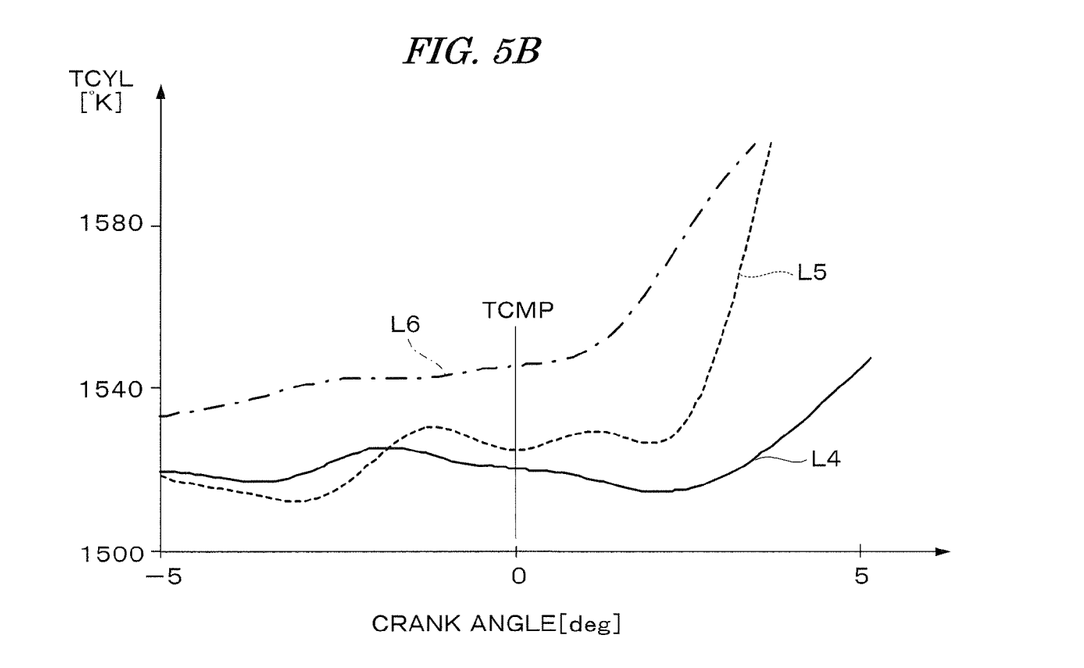

FIGS. 5A and 5B are time charts showing changes in a temperature TCYL in the cylinder. The solid line L4 and the dashed line L5 of FIGS. 5A and 5B, respectively, correspond to examples in which the pilot injection amount is set to 4 mg and 6 mg in the single pilot injection mode. The dot-and-dash line L6 corresponds to an example in which both of the first pilot injection amount QIP1 and the second pilot injection amount QIP2 are set to 2 mg (e.g., the total amount is 4 mg) in the double pilot injection mode. FIG. 5B shows an expanded part of FIG. 5A in the vicinity of the compression top dead center (CA=0 deg).

As clearly seen from FIGS. 5A and 5B, the temperature in the cylinder, when the piston is positioned at the compression top dead center, i.e., the compression end temperature TCMP in the double pilot injection mode, becomes higher than the temperature in the cylinder in the single pilot injection mode.

Therefore, it is confirmed that the ignition timing CAIGDP in the double pilot injection mode advances from the ignition timing CAIGSP in the single pilot injection mode since the compression end temperature TCMP becomes higher.

Figure 6:
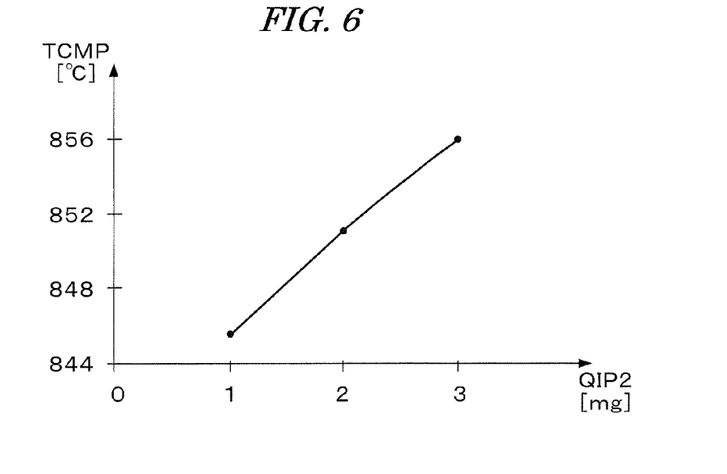
FIG. 6 is a graph illustrating a relationship between a first pilot injection amount (QIP2) and a compression end temperature (TCMP)

FIG. 6 shows a relationship between the second pilot injection amount QIP2 and the compression end temperature TCMP. If the second pilot injection amount QIP2 increases, the compression end temperature TCMP becomes high. Therefore, the compression end temperature TCMP is controlled by changing the second pilot injection amount QIP2 in the double pilot injection mode.

Therefore, in this embodiment a target compression end temperature TCMPCMD is set according to the engine operating condition, and a feedback control is performed so that an estimated compression end temperature TCMPE, which is estimated based on the engine operating condition, coincides with the target compression end temperature TCMPCMD. Accordingly, the actual compression end temperature TCMP is appropriately controlled, thereby obtaining stable ignitionability.

Figure 7:
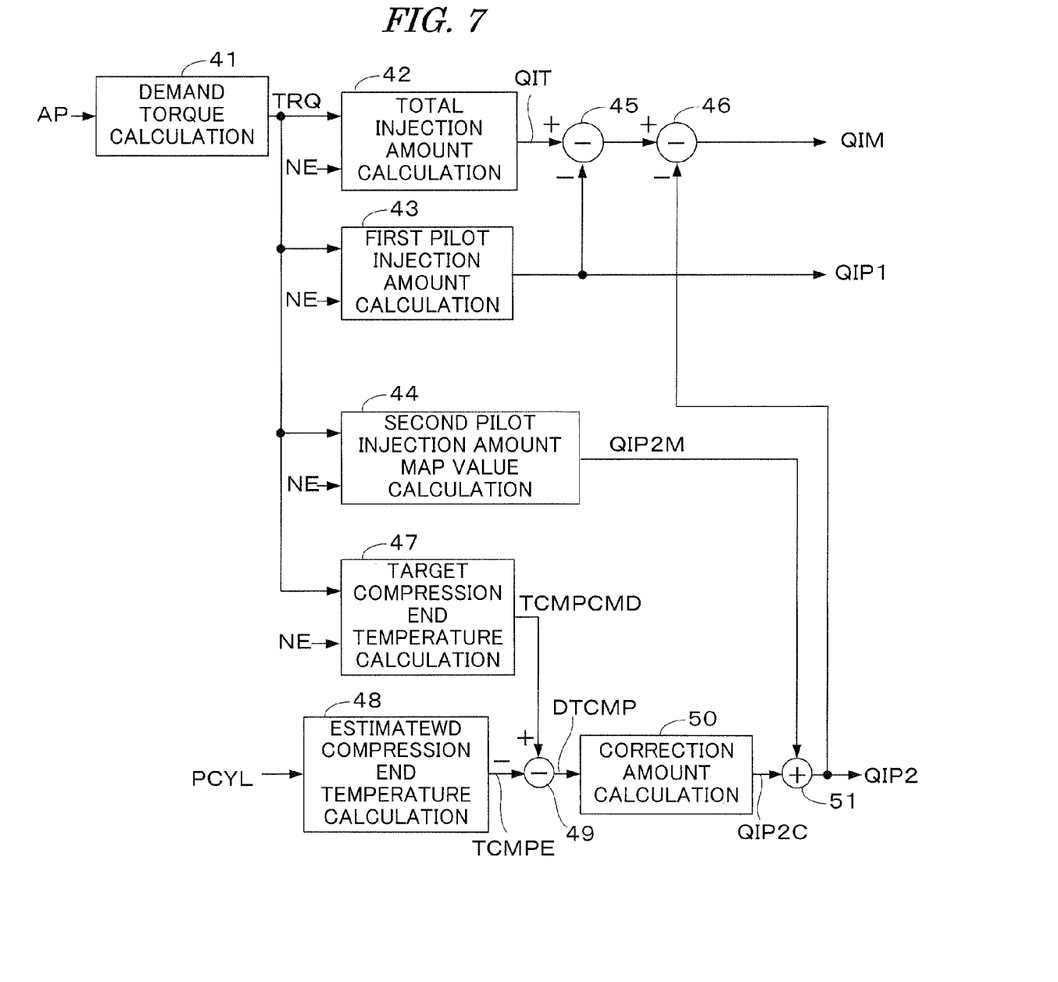
FIG. 7 is a block diagram of a first embodiment of a fuel injection amount calculation module.

FIG. 7 is a block diagram showing a configuration of an injection amount calculation module for calculating a main injection amount QIM, the first pilot injection amount QIP1, and the second pilot injection amount QIP2 of fuel injected by the fuel injection valve 6. The function of the injection amount calculation module is realized by the process executed by the CPU 14.

The injection amount calculation module shown in FIG. 7 includes a demand torque calculator 41, a total injection amount calculator 42, a first pilot injection amount calculator 43, a second pilot injection amount map value calculator 44, subtracting blocks 45 and 46, a target compression end temperature calculator 47, an estimated compression end temperature calculator 48, a subtracting block 49, a correction amount calculator 50, and an adding block 51.

The demand torque calculator 41 calculates a demand torque TRQ of the engine 1 according to the accelerator pedal operation amount AP. The demand torque TRQ is calculated to be substantially proportional to the accelerator pedal operation amount AP. However, when the accelerator pedal operation amount AP rapidly increases, the increase in the demand torque TRQ is limited in order to suppress smoke.

The total injection amount calculator 42 retrieves a total injection amount map (not shown), which is previously set according to the demand torque TRQ and the engine rotational speed NE, to calculate a total injection amount QIT. The subtracting blocks 45 and 46 subtract the first pilot injection amount QIP1 and the second pilot injection amount QIP2 from the total injection amount QIT to calculate the main injection amount QIM. The total injection amount map is set so the total injection amount QIT increases as the demand torque TRQ, and/or the engine rotational speed NE, increase(s).

The first pilot injection amount calculator 43 retrieves a first pilot injection amount map (not shown), which is previously set according to the demand torque TRQ and the engine rotational speed NE, to calculate the first pilot injection amount QIP1.

The second pilot injection amount map value calculator 44 retrieves a second pilot injection amount map (not shown), which is previously set according to the demand torque TRQ and the engine rotational speed NE, to calculate a second pilot injection amount map value QIP2M.

The target compression end temperature calculator 47 retrieves a target compression end temperature map (not shown), which is previously set according to the demand torque TRQ and the engine rotational speed NE, to calculate the target compression end temperature TCMPCMD.

The estimated compression end temperature calculator 48 calculates the estimated compression end temperature TCMPE according to the detected cylinder pressure PCYL. Specifically, a cylinder pressure PCYL0, when the piston is positioned at the compression top dead center, is applied to equation (1). By using the detected cylinder pressure PCYL, an accurate value of the estimated compression end temperature TCMPE is obtained.

$$TCMPE = KC \times PCYL0 \times VCYL0/(GT0 \times R0) \quad (1)$$

In equation (1), "KC" is a constant set to a predetermined value, "VCYL0" is a cylinder volume when the piston is positioned at the compression top dead center, "GT0" is a weight kg/cycle of total gases which exist in the cylinder, and "R0" is a modified gas constant.

The total gas weight GT0 is a sum of an intake fresh air weight GAW kg/cycle and a residual gas weight GR kg/cycle in the cylinder, as shown in equation (2). The intake fresh air weight GAW is obtained by integrating the intake air flow rate GA.

$$GT0 = GAW + GR \quad (2)$$

The residual gas weight GR is calculated by applying an average intake gas temperature TINAV, an average exhaust pressure PEXAV, and an average exhaust gas temperature TEXAV to equations (3) and (4). The average intake gas temperature TINAV, the average exhaust pressure PEXAV, and the average exhaust gas temperature TEXAV are calculated as average values in one combustion cycle. In equation (3), "α" is a temperature coefficient which is calculated by equation (4), "VST" is a cylinder capacity, "Rr" is a corrected gas constant, and "ε" is a compression ratio. It is to be noted that the temperature coefficient α is set to "0.9" when the temperature coefficient α, calculated by equation (4), is greater than "0.9". Further, in equation (3), the corrected gas constant "Rr" is applied, instead of the gas constant "R", since the constitution of the air-fuel mixture in the combustion chamber changes depending on a flow rate of recirculated exhaust gases. The corrected gas constant "Rr" is obtained by correcting the gas constant "R" for every combustion cycle according to the recirculated exhaust gas flow rate and the intake air flow rate.

$$GR = \frac{(1-\alpha) \times PEXAV \times KC \times VST}{Rr \times (TEXAV + 273.16) * (\varepsilon - 1)} \quad (3)$$

$$\alpha = \frac{(TEXAV + 273.16)/1.1 - (TINAV + 273.16)}{(TEXAV - TINAV)} \quad (4)$$

The modified gas constant R0 in equation (1) is calculated by equation (5). In equation (5), "R" is a gas constant and "λAV" is an average excessive air ratio calculated by equation (6).

$$R0 = R - (0.14/\lambda AV) \quad (5)$$

$$\lambda AV = Gab/(Thair \times Grb) \quad (6)$$

In equation (6), "Gab" is a modified air weight calculated by equation (7), "Grb" is a modified residual gas weight calculated by equation (8), and "Thair" is a theoretical air amount (=14.512).

$$Gab = Ga + Gr \times (1 - Gf/Ga) \quad (7)$$

$$Grb = Gr \times Gf/Ga \quad (8)$$

where "Gf" is a fuel weight kg/cycle injected per 1 cycle, which corresponds to the total injection amount QIT in this embodiment.

The subtracting block 49 subtracts the estimated compression end temperature TCMPE from the target compression end temperature TCMPCMD to calculate a temperature difference DTCMP. The correction amount calculator 50 calculates a correction amount QIP2C so the temperature difference DTCMP becomes "0" with the PID (proportional, integral and differential) control. The correction amount QIP2C is calculated to increase as the temperature difference DTCMP increases.

Figure 8:
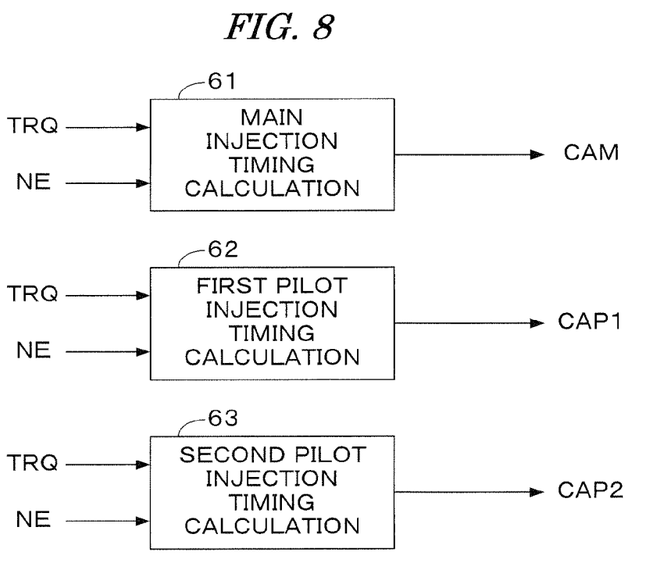
FIG. 8 is a block diagram of a fuel injection timing calculation module.

FIG. 8 is a block diagram showing a configuration of an injection timing calculation module which calculates execution timings of the fuel injection with the fuel injection valve 6, i.e., a main injection timing CAM, a first pilot injection timing CAP1, and a second pilot injection timing CAP2. The function of the injection timing calculation module is realized by the operation process executed by the CPU 14.

The injection timing calculation module includes a main injection timing calculator 61, a first pilot injection timing calculator 62, and a second pilot injection timing calculator 63. The injection timing calculators 61 to 63, respectively, retrieve a main injection timing map, a first pilot injection timing map, and a second pilot injection timing map, which are previously set according to the demand torque TRQ and the engine rotational speed NE, to calculate the main injection timing CAM, the first pilot injection timing CAP1, and the second pilot injection timing CAP2.

As described above, in this embodiment the second pilot injection amount QIP2 is controlled so that the estimated compression end temperature TCMPE coincides with the target compression end temperature TCMPCMD, which is set according to the demand torque TRQ and the rotational speed NE. The compression end temperature TCMP tends to become higher as the second pilot injection amount QIP2, which is an injection amount of the first pilot injection, increases. Accordingly, by controlling the second pilot injection amount QIP2 so the estimated compression end temperature TCMPE coincides with the target compression end temperature TCMPCMD, an appropriate value of the compression end temperature is secured to obtain stable ignitionability.

In this embodiment, the fuel injection valve 6 corresponds to the fuel injection means, and the cylinder pressure sensor 2 corresponds to the cylinder pressure detecting means. Further, the cylinder pressure sensor 2, the intake air flow rate sensor 31, the intake air temperature sensor 32, the exhaust gas temperature sensor 33, and the exhaust pressure sensor 34 constitute a part of the compression end temperature estimating means. Further, the ECU 4 constitutes a part of the compression end temperature estimating means, the target compression end temperature setting means, and the fuel injection control means. Specifically, the total injection amount calculator 42, the first pilot injection amount calculator 43, the second pilot injection amount map value calculator 44, the subtracting blocks 45, 46, and 49, the correction amount calculator 50, and the adding block 51 in FIG. 7, the main injection timing calculator 61, the first pilot injection timing calculator 62, and the second pilot injection timing calculator 63 in FIG. 8, correspond to the fuel injection control means. The target compression end temperature calculator 47 corresponds to the target compression end temperature setting means. The estimated compression end temperature calculator 48 corresponds to the compression end temperature estimating means.

Second Embodiment

In a second embodiment according to the present invention, a heat release amount in a predetermined crank angular range is calculated according to the detected cylinder pressure PCYL, and the fuel injection amount of the first pilot injection is controlled according to the calculated heat release amount when performing a plurality of pilot injections. The points in this embodiment, which are comparatively different from the first embodiment, will be described below.

As shown in FIG. 5, by adopting the double pilot injection mode, the compression end temperature TCMP is raised to improve the ignitionability of the fuel. Specifically, it is considered that the compression end temperature TCMP is raised by a combustion, or a low-temperature oxidation, of the fuel injected by the second pilot injection INJP2 to accelerate ignition of the fuel injected in the first pilot injection INJP1, which consequently improves ignitionability of the fuel injected by the main injection INJM.

Figure 9A:
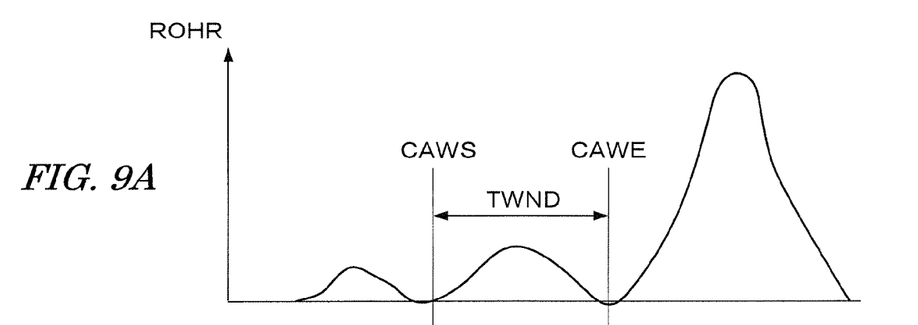
FIGS. 9A and 9B are graphs illustrating changes in the heat release rate caused by two pilot injections and a main injection.
Figure 9B:
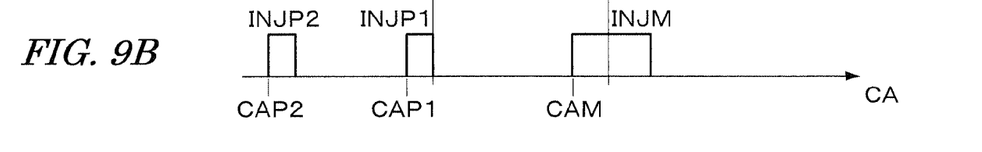

FIG. 9A shows changes in the heat release rate ROHR in the double pilot injection mode, and FIG. 9B shows execution timings of two pilot injections INJP1 and INJP2. and the main injection INJM. As shown in FIGS. 9A and 9B, the heat release rate ROHR increases in accordance with each fuel injection.

As shown in FIG. 9A, in this embodiment a heat release amount QHR in a window period TWND (i.e., a heat release amount corresponding to the first pilot injection INJP1) is calculated based on the detected pressure change rate dp/dθ and cylinder pressure PCYL, and the second pilot injection amount QIP2 is controlled so that the calculated heat release amount QHR coincides with a target heat release amount QHRCMD, which is set according to the engine operating condition. With such control, the second pilot injection amount QIP2 is appropriately controlled to obtain stable ignitionability of the fuel, especially in a low temperature condition or in a low load operating condition of the engine 1.

Figure 10:
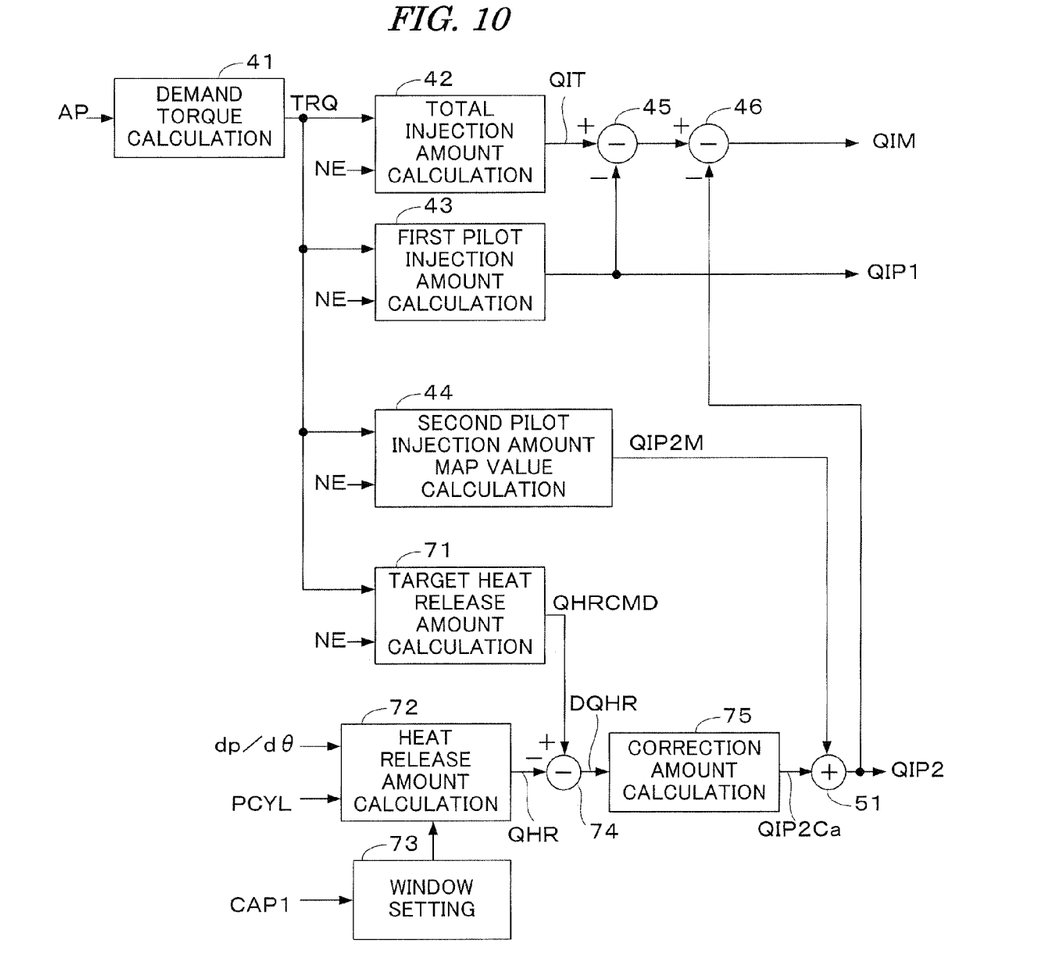
FIG. 10 is a schematic diagram of a second embodiment of a fuel injection amount calculation module (second embodiment).

FIG. 10 is a block diagram showing a configuration of an injection amount calculation module, which calculates the main injection amount QIM, the first pilot injection amount QIP1, and the second pilot injection amount QIP2 of fuel injected with the fuel injection valve 6. The function of the injection amount calculation module is realized by the operation process executed by the CPU 14.

The injection amount calculation module shown in FIG. 10 includes the demand torque calculator 41, the total injection amount calculator 42, the first pilot injection amount calculator 43, the second pilot injection amount map value calculator 44, the subtracting blocks 45 and 46, a target heat release amount calculator 71, a heat release amount calculator 72, a window setter 73, a subtracting block 74, a correction amount calculator 75, and the adding block 51. Subsequently, the module shown in FIG. 10 is obtained by deleting the target compression end temperature calculator 47, the estimated compression end temperature calculator 48, the subtracting block 49, and the correction amount calculator 50 in the injection amount calculation module shown in FIG. 7, and by adding the target heat release amount calculator 71, the heat release amount calculator 72, the window setter 73, the subtracting block 74, and the correction amount calculator 75.

The target heat release amount calculator 71 retrieves a target heat release amount map (not shown), which is previously set according to the demand torque TRQ and the engine rotational speed NE, to calculate the target heat release amount QHRCMD in the window period TWND.

The heat release amount calculator 72 calculates the heat release rate ROHR J/deg according to the detected pressure change rate dp/dθ and cylinder pressure PCYL, and calculates the heat release amount QHR by integrating the heat release rate ROHR in the window period TWND. The heat release rate ROHR is calculated by equation (11).

$$ROHR = \kappa/(\kappa-1) \times PCYL \times dV/d\theta + 1/(\kappa-1) \times VCYL \times dp/d\theta \quad (11)$$

In equation (11), "κ" is a specific heat ratio of the air-fuel mixture, "PCYL" is a detected pressure in the cylinder, "dV/dθ" is a cylinder volume increase rate $m^3$/deg, "VCYL" is a cylinder volume, and "dp/dθ" is a pressure change rate kPa/deg.

Shown in FIG. 9A, the window setting block 73 sets the window period TWND according to the first pilot injection timing CAP1 calculated by the fuel injection timing calculation module shown in FIG. 8. Specifically, as an example, a first pilot injection end timing CAP1E is calculated according to the first pilot injection timing CAP1 and the first pilot injection amount QIP1; a window start timing CAWS is set to the first pilot injection end timing CAP1E; and a window end timing CAWE is set to a timing obtained by adding a predetermined angle DCAW (for example, 13 degrees) to the window start timing CAWS. Alternatively, the window end timing CAWE may be set according to the heat release rate ROHR. For example, the window end timing CAWE may be set to a timing at which the heat release rate ROHR first reaches "0" after the window start timing CAWS.

The subtracting block 74 subtracts the heat release amount QHR from the target heat release amount QHRCMD to calculate a heat release amount difference DQHR. The correction amount calculator 75 calculates a correction amount QIP2Ca so the heat release amount difference DQHR becomes "0" with the PID (proportional, integral and differential) control. The correction amount QIP2Ca is calculated to increase as the heat release amount difference DTCMP increases.

Since the heat release amount QHR in the window period TWND changes depending not only on the first pilot injection amount QIP1, but also on the second pilot injection amount QIP2, the first pilot injection amount QIP1 becomes substantially constant if the engine operating condition is substantially steady. Therefore, by calculating the second pilot injection amount QIP2 using the correction amount QIP2Ca, the heat release amount QHR is made to coincide with the target heat release amount QHRCMD.

As described above, in this embodiment the second pilot injection amount QIP2 is controlled so the heat release amount QHR corresponding to the first pilot injection INJP1 coincides with the target heat release amount QHRCMD, which is set according to the demand torque TRQ and the engine rotational speed NE. The window period TWND is set so the heat release amount QHR after execution of the first pilot injection INJP1 is obtained. Therefore, the fuel injection amount QIP2 in the second pilot injection INJP2 (the pilot injection which is performed prior to the first injection INJP1) is controlled so the heat release amount QHR due to the first pilot injection INJP1, which is performed immediately before the main injection INJM, coincides with the target heat release amount QHRCMD. According to this control, ignitionability of the fuel injected in the first pilot injection INJP1, and consequently of the fuel injected in the main injection INJM, is improved. As a result, stable ignitionability is obtained, especially in the low temperature condition, or in the low load operating condition, of the engine 1.

In this embodiment, the fuel injection valve 6 corresponds to the fuel injection means, and the cylinder pressure sensor 2 corresponds to the cylinder pressure detecting means. Further, the ECU 4 constitutes the heat release amount calculation means and the fuel injection control means. Specifically, the total injection amount calculator 42, the first pilot injection amount calculator 43, the second pilot injection amount map value calculator 44, the target heat release amount calculator 71, the subtracting blocks 45, 46, and 74, the correction amount calculator 75, and the adding block 51 in FIG. 7, and the main injection timing calculator 61, the first pilot injection timing calculator 62, and the second pilot injection timing calculator 63 in FIG. 8, correspond to the fuel injection control means. The heat release amount calculator 72 and the window setter 73 correspond to the heat release amount calculation means.

The present invention is not limited to the embodiments described above, and various modifications may be made thereto without departing from the spirit and/or scope thereof. For example, in the above-described first embodiment, the estimated compression end temperature TCMPE is calculated according to the detected cylinder pressure PCYL. Alternatively, the estimated compression end temperature TCMPE may be calculated using equation (9).

$$TCMPE = TIN \times \epsilon^{\kappa-1} \qquad (9)$$

where "$\epsilon$" is a compression ratio, and "$K$" is a polytropic index which is calculated, for example, according to the intake air temperature TIN, the engine coolant temperature TW, and the engine rotational speed NE.

Further, the estimated compression end temperature TCMPE may be calculated with the method shown in JP '435.

Further in the embodiments described above, the first pilot injection amount QIP1 is calculated using the first pilot injection amount map. Alternatively, a total pilot injection amount QITP, which is a sum of the first pilot injection amount QIP1 and the second pilot injection amount QIP2, may be calculated according to the demand torque TRQ and the engine rotational speed NE, and the first pilot injection amount QIP1 may be calculated by subtracting the second pilot injection amount QIP2 from the total pilot injection amount QITP.

The present invention can also be applied to a control system for a watercraft propulsion engine, such as an outboard engine having a vertically extending crankshaft.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A control system for an internal combustion engine having fuel injection means for injecting fuel into a combustion chamber of said engine, the control system comprising:
   compression end temperature estimating means for estimating a compression end temperature in the combustion chamber;
   target compression end temperature setting means for setting a target compression end temperature according to an operating condition of said engine;
   fuel injection control means for performing a main injection and a plurality of pilot injections, wherein at least one pilot injection is performed before the main injection by said fuel injection means;
   correction means for calculating a correction amount according to a temperature difference between the estimated compression end temperature and the target compression end temperature, and
   wherein said fuel injection control means controls a fuel injection amount in a first-performed pilot injection of the plurality of pilot injections, based on the correction amount, such that the estimated compression end temperature coincides with the target compression end temperature.

2. The control system according to claim 1, further comprising cylinder pressure detecting means for detecting a pressure in the combustion chamber,
   wherein said compression end temperature estimating means estimates the compression end temperature according to the pressure detected by said cylinder pressure detecting means.

3. A control system for an internal combustion engine having fuel injection means for injecting fuel into a combustion chamber, said control system comprising:
   cylinder pressure detecting means for detecting a pressure in the combustion chamber;
   heat release amount calculating means for calculating a heat release amount in a predetermined crank angle range according to a pressure detected by said cylinder pressure detecting means;
   targeting heat release amount calculating means for setting a target heat release amount in a window period according to an operation condition of said engine;
   fuel injection control means for performing a main injection and a plurality of pilot injections, wherein at least one pilot injection is performed before the main injection by said fuel injection means;
   correction means for calculating a correction amount according to a heat release amount difference between the calculated heat release amount and the target heat release amount, and
   wherein said fuel injection control means controls a fuel injection amount in a first-performed pilot injection of the plurality of pilot injections, based on the correction amount, such that the calculated heat release amount coincides with the target heat release amount.

4. A control method for an internal combustion engine having at least one fuel injection valve for injecting fuel into a combustion chamber of said engine, the control method comprising the steps of:
   estimating a compression end temperature in the combustion chamber;
   setting a target compression end temperature according to an operating condition of said engine;
   performing a main injection and a plurality of pilot injections, wherein at least one pilot injection is performed before the main injection by said at least one fuel injection valve
   calculating a correction amount to a temperature difference between the estimated compression end temperature and the target compression end temperature, and
   wherein a fuel injection amount in a first-performed pilot injection of the plurality of pilot injections is controlled, based on the correction amount such that the estimated compression end temperature coincides with the target compression end temperature.

5. The control method according to claim 4, further comprising the step of:

detecting a pressure in the combustion chamber,
wherein the compression end temperature is estimated according to the detected pressure.

6. A control method for an internal combustion engine having at least one fuel injection valve for injecting fuel into a combustion chamber, said control method comprising the steps of:

detecting a pressure in the combustion chamber;

calculating a heat release amount in a predetermined crank angular range according to the detected pressure;

setting a target heat release amount in a window period according to an operation condition of said engine; and performing a main injection and a plurality of pilot injections, wherein at least one pilot injection is performed before the main injection by said at least one fuel injection valves;

calculating a correction amount according to a heat release amount difference between the calculated heat release amount and the target heat release amount, wherein a fuel injection amount in a first-performed pilot injection of the plurality of pilot injections is controlled, based on the correction amount, such that the calculated heat release amount coincides with the target heat release amount.

* * * * *